United States Patent
Veeramasuneni et al.

(10) Patent No.: US 6,815,049 B2
(45) Date of Patent: Nov. 9, 2004

(54) GYPSUM-CONTAINING COMPOSITION HAVING ENHANCED RESISTANCE TO PERMANENT DEFORMATION

(75) Inventors: Srinivas Veeramasuneni, Grayslake, IL (US); Qiang Yu, Grayslake, IL (US); William A. Frank, Lindenhurst, IL (US)

(73) Assignee: United States Gypsum Company, Chicago, IL (US)

( * ) Notice: Subject to any disclaimer, the term of this patent is extended or adjusted under 35 U.S.C. 154(b) by 136 days.

(21) Appl. No.: 10/015,066

(22) Filed: Dec. 11, 2001

(65) Prior Publication Data

US 2003/0118803 A1 Jun. 26, 2003

(51) Int. Cl.⁷ ................................................. B32B 5/22
(52) U.S. Cl. ................................ 428/317.9; 428/304.4; 428/70; 428/307.3; 428/312.2; 428/312.4; 428/316.6
(58) Field of Search .............................. 428/304.4, 535, 428/536, 219, 70, 307.3, 312.2, 312.4, 316.6, 317.9

(56) References Cited

U.S. PATENT DOCUMENTS

| | | | | |
|---|---|---|---|---|
| 3,297,601 A | * | 1/1967 | Maynard et al. ............ | 260/17.4 |
| 4,009,062 A | * | 2/1977 | Long ............................ | 156/39 |
| 4,051,291 A | * | 9/1977 | Long ............................ | 428/201 |
| 5,395,438 A | * | 3/1995 | Baig et al. ................... | 106/214 |
| 6,342,284 B1 | * | 1/2002 | Yu et al. ....................... | 428/70 |
| 6,387,172 B1 | * | 5/2002 | Yu et al. ...................... | 106/680 |
| 6,409,824 B1 | * | 6/2002 | Veeramasuneni et al. ... | 106/772 |

FOREIGN PATENT DOCUMENTS

| | | |
|---|---|---|
| EP | 1041209 | 10/2000 |
| FR | 1164344 | 10/1958 |
| WO | WO 00/06518 | 2/2000 |

* cited by examiner

*Primary Examiner*—Merrick Dixon
(74) *Attorney, Agent, or Firm*—John M. Lorenzen; David F. Janci; Leydig, Voit & Mayer, Ltd.

(57) ABSTRACT

A composition including, but not limited to, a mixture of a calcium sulfate material, water, and a tetrametaphosphate compound is disclosed. Desirably, the inclusion of the tetrametaphosphate compound (e.g., salt or ion) in a pre-set treatment of a calcium sulfate material enhances the resistance to permanent deformation (e.g., sag), dimensional stability, and/or compressive strength of the composition while also preferably avoiding any significant retardive effect on the rate of hydration of calcined gypsum to calcium sulfate dihydrate. A set gypsum-containing product and a method for producing a set gypsum-containing product having increased resistance to permanent deformation are also disclosed.

44 Claims, No Drawings

GYPSUM-CONTAINING COMPOSITION HAVING ENHANCED RESISTANCE TO PERMANENT DEFORMATION

TECHNICAL FIELD OF THE INVENTION

The present invention relates generally to gypsum compositions. More particularly, the invention relates to set gypsum-containing compositions that exhibit enhanced strength, dimensional stability, and resistance to permanent deformation, and to methods, gypsum-containing compositions, and products related thereto.

BACKGROUND OF THE INVENTION

Set gypsum (calcium sulfate dihydrate) is a well-known material that is included commonly in many types of products. By way of example, set gypsum is a major component of end products created by the use of traditional plasters (e.g., plaster-surfaced internal building walls) and also in paper-faced gypsum boards employed in typical drywall construction of interior walls and ceilings of buildings. In addition, set gypsum is the major component of gypsum/cellulose fiber composite boards and products, and also is included in products that fill and smooth the joints between edges of gypsum boards. Also, many specialty materials, such as materials useful for modeling and mold-making that are precisely machined, produce products that contain major amounts of set gypsum.

Typically, such gypsum-containing products are prepared by forming a mixture of calcined gypsum (calcium sulfate hemihydrate and/or calcium sulfate anhydrite) and water (and other components, as appropriate). The mixture is cast into a desired shape or onto a surface, and then allowed to harden to form set (i.e., rehydrated) gypsum by reaction of the calcined gypsum with the water to form a matrix of crystalline hydrated gypsum (calcium sulfate dihydrate). It is the desired hydration of the calcined gypsum that enables the formation of an interlocking matrix of set gypsum crystals, thus imparting strength to the gypsum structure in the gypsum-containing product. Mild heating is utilized to drive off the remaining free (i.e., unreacted) water to yield a dry product.

One problem with such gypsum-containing products is that they often are subject to permanent deformation (e.g., sag), especially under conditions of high humidity, temperature, or load. For example, the possibility of sag is particularly problematic where gypsum-containing boards and tiles are stored or employed in a manner in which they are positioned horizontally. In this respect, if the set gypsum matrix in these products is not sufficiently resistant to permanent deformation, the products may start to sag in areas between the points to which they are fastened, or supported by, an underlying structure. This can be unsightly and can cause difficulties during use of the products. Furthermore, in many applications, gypsum-containing products must be able to carry loads, e.g., insulation or condensation loads, without perceptible sag.

Another problem with such set gypsum-containing products is that dimensional stability can be compromised during their manufacture, processing, and commercial application. For example, in the preparation of set gypsum products, there is usually a significant amount of free (i.e., unreacted) water left in the matrix after the gypsum has set. Upon drying of the set gypsum in order to drive off the excess water, the interlocking set gypsum crystals in the matrix tend to move closer together as the water evaporates. In this respect, as the water leaves the crystal interstices of the gypsum matrix, the matrix tends to shrink from natural forces of the set gypsum that were resisting capillary pressure applied by the water on the gypsum crystals. As the amount of water in the aqueous calcined gypsum mixture increases, lack of dimensional stability becomes more of a problem.

Dimensional stability is also of concern even after the final dried product is realized, especially under conditions of changing temperature and humidity where set gypsum is susceptible to, for example, expansion and shrinkage. For example, moisture taken up in crystal interstices of a gypsum matrix of a gypsum board or tile exposed to high humidity and temperature can aggravate a sagging problem by causing the humidified board to expand.

If such dimensional instability could be avoided or minimized, various benefits would result. For example, existing gypsum board production methods would yield more product if the boards did not shrink during drying, and gypsum-containing products desired to be relied upon to hold a precise shape and dimensional proportions (e.g., for use in modeling and mold making) would serve their purposes better.

International Publication No. WO 99/08979 describes the use of polyphosphates as an enhancing material to achieve the goals of resistance to permanent deformation (e.g., sag) and enhanced dimensional stability. According to WO 99/08979, polyphosphates in general produce the benefits of resistance to permanent deformation and enhanced dimensional stability whether the polyphosphates are used to treat a calcium sulfate material before it rehydrates to form set gypsum (i.e., a "pre-set treatment") or to treat an already-set gypsum (i.e., a "post-set treatment"). In many situations, carrying out a post-set treatment is more complicated and difficult to achieve than a pre-set treatment because, for example, once the set gypsum is in place, it can be difficult to absorb the enhancing material into the set gypsum or to contact the set gypsum with the enhancing material (e.g., where the set gypsum is covered with paper). Thus, it generally is more desirable to impart resistance to permanent deformation and enhanced dimensional stability by way of a pre-set treatment of a calcium sulfate material. However, almost all of the polyphosphates described in WO 99/08979 have a negative effect on the strength of the resulting set gypsum-containing product when used in a pre-set treatment.

Thus, there is a continuing need to impart resistance to permanent deformation and enhanced dimensional stability in a pre-set treatment while maintaining or, preferably, even increasing the strength (e.g., compressive strength) of the resulting set gypsum-containing product. Of the polyphosphate enhancing materials disclosed in WO 99/08979, only the trimetaphosphate compounds were found to actually increase strength upon addition in a pre-set treatment. It would be desirable to identify alternative enhancing materials for achieving resistance to permanent deformation and enhanced dimensional stability in a pre-set treatment of a calcium sulfate material while maintaining or, preferably, even increasing the strength of the resultant set gypsum product so as to afford flexibility in manufacture and in choosing raw materials.

Accordingly, it will be appreciated from the foregoing that there is a need in the art for an alternative pre-set treatment of a calcium sulfate material for increasing resistance to permanent deformation (e.g., sag) and dimensional stability while maintaining or, preferably, even increasing the strength of the resultant set gypsum product. The invention satisfies this need. These and other advantages of the present invention, as well as additional inventive features, will be apparent from the description of the invention provided herein.

BRIEF SUMMARY OF THE INVENTION

The present invention provides a composition comprising a calcium sulfate material, a set gypsum-containing product, and a method for producing a set gypsum-containing product having increased resistance to permanent deformation, while maintaining or increasing strength.

In accordance with the present invention, it has been found that the inclusion of a tetrametaphosphate compound (e.g., salt or ion) in a pre-set treatment of a calcium sulfate material enhances the resistance to permanent deformation (e.g., sag) while maintaining or, preferably, increasing compressive strength of the composition. Furthermore, it is expected that the addition of the tetrametaphosphate in a pre-set treatment will enhance the dimensional stability of the resulting set gypsum-containing product. It is to be noted that, although the singular is utilized for convenience to describe certain terms such as the tetrametaphosphate compound and the calcium sulfate material, it will be understood that singular terms such as "a," "an," and "the" are meant to cover both the singular and the plural (e.g., tetrametaphosphate compounds, calcium sulfate materials, or the like), unless otherwise indicated herein or clearly contradicted by context.

Thus, in one aspect, the present invention provides a composition comprising a mixture of a calcium sulfate material, water, and a tetrametaphosphate compound. As used herein, the term "calcium sulfate material" refers to calcium sulfate anhydrite, calcium sulfate hemihydrate, ions of calcium and sulfate, or mixtures of any of the foregoing, but is not meant to refer to calcium sulfate dihydrate (i.e., set gypsum). In some embodiments, an accelerator for increasing the rate of the hydration of the calcium sulfate material to produce calcium sulfate dihydrate (i.e., set gypsum) optionally is included in the composition, for example, when the composition is used to prepare a board. Some embodiments optionally also can include pregelatinized starch, aqueous foam, and/or other ingredients as will be appreciated readily by one of ordinary skill in the art.

The composition of the invention is useful to produce set gypsum-containing products that exhibit sag resistance while maintaining or increasing compressive strength. Desirably, when the composition is cast to form a ½ inch board comprising an interlocking matrix of set gypsum, the board has a sag resistance, as determined according to ASTM C473-95, of less than about 0.1 inch per two-foot length of said board. Also, when the composition is used to prepare a product comprising an interlocking matrix of set gypsum, the product has at least as much strength, and preferably has more strength, than it would have if the tetrametaphosphate compound had not been included in the mixture.

In some embodiments, the composition comprises set gypsum and host particles such that at least a portion of the set gypsum is positioned in and about accessible voids in the host particles. As a result, in another aspect, the present invention provides a composition comprising a mixture of the host particles having the accessible voids therein; calcium sulfate hemihydrate, at least a portion of which is in the form of crystals in and about the voids of the host particles; and a tetrametaphosphate compound. When the composition is cast to form a ½ inch board comprising an interlocking matrix of set gypsum, the board preferably has a sag resistance, as determined according to ASTM C473-95, of less than about 0.1 inch per two-foot length of the board, and the board has at least as much strength, and preferably has more strength, than it would have if the tetrametaphosphate compound had not been included in the mixture.

In some embodiments of the invention, the composition is mixed with water to produce a machinable set gypsum-containing product or a joint compound. The machinable set gypsum-containing product comprises a mixture of a starch, particles of a water-redispersible polymer, calcium sulfate hemihydrate, and a tetrametaphosphate compound. The joint compound is useful for finishing joints between edges of gypsum boards, and comprises a mixture of a binder, a thickener, a non-leveling agent, calcium sulfate hemihydrate, and a tetrametaphosphate compound.

Some embodiments of the inventive composition are useful for producing an acoustical tile. Such compositions comprise a mixture of a calcium sulfate material, water, and a tetrametaphosphate compound, as well as one or more of a gelatinized starch, a mineral wool, expanded perlite particles, and/or a fiber reinforcing agent. By way of example, in some embodiments, the composition comprises a mixture of a gelatinized starch, a mineral wool, a calcium sulfate material, water, and a tetrametaphosphate compound. As another example, in some embodiments, the composition comprises a mixture of a gelatinized starch, expanded perlite particles, a fiber reinforcing agent, a calcium sulfate material, water, and a tetrametaphosphate compound.

In another aspect of the invention, a method for producing a set gypsum-containing product having increased resistance to permanent deformation is provided. The method comprises forming a mixture of a calcium sulfate material, water, and a tetrametaphosphate compound. The mixture is maintained under conditions sufficient for the calcium sulfate material to form an interlocking matrix of set gypsum material. The tetrametaphosphate compound is included in the mixture in an amount such that the set gypsum-containing product has greater resistance to permanent deformation than it would have if the tetrametaphosphate compound had not been included in the mixture.

In yet another aspect of the invention, a method for producing a set gypsum-containing product having enhanced strength is provided. The method comprises forming a mixture of a calcium sulfate material, water, and a tetrametaphosphate compound. The mixture is maintained under conditions sufficient for the calcium sulfate material to form an interlocking matrix of set gypsum material. The tetrametaphosphate compound is included in the mixture in an amount such that the set gypsum-containing product has greater strength than it would have if the tetrametaphosphate compound had not been included in the mixture.

In still another aspect, the present invention provides a set gypsum product. In some embodiments, the set gypsum product is a gypsum board. For example, the present invention provides gypsum board comprising an interlocking matrix of set gypsum formed from, i.e., using, at least calcined gypsum, water and a tetrametaphosphate compound. Preferably, the gypsum board has a sag resistance, as determined according to ASTM C473-95, of less than about 0.1 inch per two-foot length of the board, while maintaining or increasing strength.

In some embodiments, the set gypsum product is a gypsum board comprising a core of material sandwiched between cover sheets. The core comprises an interlocking matrix of set gypsum. Preferably, the board is prepared by a method comprising forming or depositing a mixture between the cover sheets, wherein the mixture comprises a calcium sulfate material, water, and a tetrametaphosphate compound. The mixture is maintained under conditions sufficient for the calcium sulfate material to form the interlocking matrix of set gypsum. The tetrametaphosphate compound is included in the mixture in an amount such that the gypsum board has a sag resistance, as determined according to ASTM C473-95, of less than about 0.1 inch per two foot length of the board, while maintaining or increasing strength.

The invention may best be understood with reference to the accompanying drawings and in the following detailed description of the preferred embodiments.

DESCRIPTION OF THE PREFERRED EMBODIMENTS

The present invention provides tetrametaphosphate in a pre-set treatment of a calcium sulfate material. The invention can be practiced employing compositions and methods similar to those employed in the prior art to prepare various set gypsum-containing products. The essential difference in the compositions and methods of some preferred embodiments of this invention from compositions and methods employed in the prior art to prepare various set gypsum-containing products is that a tetrametaphosphate compound (such as a tetrametaphosphate salt) is included. It will be appreciated by those skilled in the art that while a tetrametaphosphate compound can be used to form the mixture described herein, the tetrametaphosphate may exist as the ion in the mixture, particularly with water present and prior to setting and drying. Thus, the term "tetrametaphosphate compound" is intended to mean such a compound itself or the tetrametaphosphate ion. Because the invention is particularly useful in a pre-set treatment, in practicing the methods of the invention, rehydration of calcined gypsum to form an interlocking matrix of set gypsum takes place in the presence of tetrametaphosphate ion and thereby produces the benefits of the invention. In other respects the compositions and methods of the invention can be the same as the corresponding compositions and methods of the prior art.

Tetrametaphosphate compounds, also referred to as cyclotetraphosphates, that are included in compositions of the invention can comprise any water-soluble tetrametaphosphate compound or ion that does not adversely interact with other components of the composition. Some examples of useful salts are sodium tetrametaphosphate, potassium tetrametaphosphate, ammonium tetrametaphosphate, lithium tetrametaphosphate, aluminum tetrametaphosphate, and mixed salts thereof, among others. Sodium tetrametaphosphate is preferred.

The tetrametaphosphate compound can be prepared in any suitable manner. For example, in one embodiment, the tetrametaphosphate compound can be in the form of sodium tetrametaphosphate, which may be synthesized by hydration of phosphorus pentaoxide at temperatures below about 7° C. to yield tetrametaphosphoric acid, as follows:

$$2P_2O_5 + 2H_2O \rightarrow H_4P_4O_{12}$$

The acid is then reacted with sodium hydroxide to form the sodium tetrametaphosphate, which is a tetrahydrate, as follows:

$$H_4P_4O_{12} + 4NaOH \rightarrow Na_4P_4O_{12} \cdot 4H_2O$$

Inasmuch as the sodium tetrametaphosphate is in a highly soluble form, a salt or solvent can be added to the solution product to precipitate sodium tetrametaphosphate. For example, ethanol or sodium chloride can be added for this purpose. In a similar way, tetrametaphosphate salts of potassium, lithium, aluminum, and the like, can be prepared. The synthesis of cyclotetraphosphates is described, for example, in Bell, R. N.; Audrieth, L. F.; Hill, O. F. *Industrial and Engineering Chemistry* 1952, 44, 568, which is incorporated by reference herein.

While not wishing to be bound by any particular theory, it is hypothesized that addition of the tetrametaphosphate compound in a pre-set treatment enhances the strength at each contact point in the crystalline gypsum structure after setting takes place. As a result, it is believed that the tetrametaphosphate compound imparts enhanced strength and dimensional stability to the set gypsum-containing product. With respect to dimensional stability, it is expected and preferred that the resulting gypsum product, e.g., board, exhibits a drying shrinkage of less than about 0.06 inch per four foot width and less than about 0.30 inch per twelve foot length and/or that the gypsum product exhibits a drying shrinkage of less than about 0.13% across its width and less than about 0.26% across its length, wherein length and width are measured according to ASTM C473-95. As will be appreciated by one of ordinary skill in the art, drying shrinkage is the shrinkage that might occur when excess water is dried off after completion of setting (hydration). This is done, for example, by measuring length and width of board (e.g., in accordance with the ASTM C473-95) after completion of setting hydration but before drying off excess water (for example, in a kiln) and then measuring again after drying, and then calculating the difference.

In preferred embodiments, a tetrametaphosphate salt is dissolved in an aqueous mixture of calcined gypsum in concentration of from about 0.004% to about 2.0% by weight, based on the weight of the calcined gypsum, to yield tetrametaphosphate ion in the mixture. A preferred concentration of tetrametaphosphate compound is from about 0.04% to about 0.16%. A more preferred concentration is about 0.08%. If desired, for easier storage and delivery in the practice of some embodiments of the invention, the tetrametaphosphate salt can be predissolved in water and inserted into the mixture in the form of an aqueous solution.

In accordance with a preferred embodiment of the invention, the tetrametaphosphate ion need only be present in the aqueous mixture of calcined gypsum during the hydration of the calcined gypsum to form set gypsum. Therefore, it is usually most convenient and thus preferred to add the tetrametaphosphate compound into the mixture at an early stage.

It is also sufficient to add the tetrametaphosphate compound to a mixture of calcined gypsum and water at a somewhat later stage. For example, in preparing typical gypsum boards, water and calcined gypsum are brought together in a mixing apparatus, are mixed thoroughly, and then are usually deposited onto a cover sheet on a moving belt, and a second cover sheet is placed over the deposited mixture before the major part of the rehydration of calcined gypsum to form set gypsum occurs. While it is most convenient to add the tetrametaphosphate compound to the gypsum-containing mix during its preparation in the mixing apparatus, it is also sufficient to add the tetrametaphosphate ion at a later stage, e.g., by spraying an aqueous solution of the ion onto the deposited aqueous mixture of calcined gypsum just before the second cover sheet is placed over the deposit, so that the aqueous tetrametaphosphate ion solution will soak into the deposited mixture and be present when the bulk of the hydration to form set gypsum occurs.

Other alternative methods of adding the tetrametaphosphate compound into the mixture will be apparent to those of ordinary skill in the art and are of course considered to be within the scope of the present invention. For example, it may be possible to pre-coat one or both of the cover sheets with a tetrametaphosphate salt or salt solution, so that the salt will dissolve and cause tetrametaphosphate ion to migrate through the mixture when the deposit of aqueous mixture of calcined gypsum comes into contact with the cover sheet. Another alternative is to mix a tetrametaphosphate salt with raw gypsum even before it is heated to form calcined gypsum, so that the salt is already present when the calcined gypsum is mixed with water to cause rehydration.

The calcined gypsum employed in the invention can be in the form of concentrations typically found useful in the corresponding embodiments of the prior art. The calcined gypsum used in the practice of the invention can be alpha calcium sulfate hemihydrate, beta calcium sulfate hemihydrate, water-soluble calcium sulfate anhydrite, or mixtures of any and all thereof, from natural or synthetic sources. In some preferred embodiments alpha calcium sulfate hemihydrate is employed for its yield of set gypsum having relatively high strength. In other preferred embodiments beta calcium sulfate hemihydrate or a mixture of beta calcium sulfate hemihydrate and water-soluble calcium sulfate anhydrite are employed.

Other conventional additives can be employed in the practice of the invention in customary amounts to impart desirable properties and to facilitate manufacturing such as, for example, aqueous foam, set accelerators, set retarders, recalcination inhibitors, binders, adhesives, dispersing aids, leveling or nonleveling agents, thickeners, bactericides, fungicides, pH adjusters, colorants, reinforcing materials, fire retardants, water repellants, fillers and mixtures thereof.

In some preferred inventive embodiments wherein the method and composition are for preparing gypsum board comprising a core of set gypsum-containing material sandwiched between cover sheets, tetrametaphosphate compound is employed in the concentrations and manner described above. In other respects, the composition and method can be practiced with the same components and in the same manner as the corresponding compositions and methods for preparing gypsum board of the prior art, for example, as described in U.S. Pat. Nos. 4,009,062 and 2,985,219, the disclosures of which are incorporated herein by reference. Boards produced using this preferred inventive composition and method exhibit improved strength, resistance to permanent deformation, and dimensional stability.

In preferred methods and compositions for preparing gypsum board, wherein the surface sheets of the board comprise paper, a pregelatinized starch is also employed to avoid the otherwise slightly increased risk of paper delamination under conditions of extreme moisture. Pregelatinizing of raw starch is achieved by cooking in water at temperatures of at least 185° F. or by other well known methods.

Some examples of readily available pregelatinized starches that serve the purposes of the present invention are (identified by their commercial names): PCF1000 starch, available from Lauhoff Grain Co.; and AMERIKOR 818 and HQM PREGEL starches, both available from Archer Daniels Midland Co.

To be used in a preferred practice of the invention, the pregelatinized starch is included in the aqueous mixture of calcined gypsum at a concentration of from about 0.08 to about 0.5 percent by weight, based on the weight of the calcined gypsum. A preferred concentration of pregelatinized starch is from about 0.16 to about 0.4 percent. A more preferred concentration is about 0.3 percent. If the corresponding embodiment of the prior art also contains a starch that has not been pregelatinized (as many do), the pregelatinized starch in the inventive embodiment can also serve to replace all or a portion of the amount of that prior art starch normally employed.

In embodiments of the invention that employ a foaming agent to yield voids in the set gypsum-containing product to provide lighter weight, any of the conventional foaming agent known to be useful in preparing foamed set gypsum products can be employed. Many such foaming agents are well known and readily available commercially, e.g., from GEO Specialty Chemicals in Ambler, Pa. For further descriptions of useful foaming agent, see, for example: U.S. Pat. Nos. 4,676,835; 5,158,612; 5,240,639 and 5,643,510; and PCT International Application Publication WO 95/16515, published Jun. 22, 1995.

In many cases it will be preferred to form relatively large voids in the gypsum product, in order to help maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing foamed gypsum product. However, it is preferable to blend such foaming agents concurrently and continuously, as an integral "on-line" part of the process. This can be accomplished, for example, by pumping separate streams of the different foaming agents and bringing the streams together at, or just prior to, the foam generator that is employed to generate the stream of aqueous foam which is then inserted into and mixed with the calcined gypsum slurry. By blending in this manner, the ratio of foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. Nos. 5,643,510 and 5,683,635.

An example of one type of foaming agent, useful to generate unstable foams, has the formula

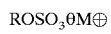

wherein R is an alkyl group containing from 2 to 20 carbon atoms, and M is a cation. Preferably, R is an alkyl group containing from 8 to 12 carbon atoms.

An example of one type of foaming agent, useful to generate stable foams, has the formula

wherein X is a number from 2 to 20, Y is a number from 0 to 10 and is greater than 0 in at least 50 weight percent of the foaming agent, and M is a cation.

In some preferred embodiments of the invention, foaming agents having the formulas (Q) and (J) above are blended together, such that the formula (Q) foaming agent and the portion of the formula (J) foaming agent wherein Y is 0, together constitute from 86 to 99 weight percent of the resultant blend of foaming agents.

In some preferred embodiments of the invention, the aqueous foam has been generated from a pre-blended foaming agent having the formula

wherein X is a number from 2 to 20, Y is a number from 0 to 10 and is 0 in at least 50 weight percent of the foaming agent, and M is a cation. Preferably, Y is 0 in from 86 to 99 weight percent of the formula (Z) foaming agent.

In some preferred inventive embodiments wherein the method and composition are for preparing a composite board comprising set gypsum and particles of a reinforcing material, tetrametaphosphate compound is employed in the concentrations and manner described above. It is particularly preferred that the composite product comprise set gypsum and host particles, at least a portion of the set gypsum being positioned in and about accessible voids in the host particles. The inventive composition comprises a mixture of: host particles having accessible voids therein; calcined gypsum, at least a portion of which is in the form of crystals in and about the voids in the host particles; and a water-soluble tetrametaphosphate salt. The composition can be mixed with water to produce an inventive mixture of water, host particles having accessible voids therein, calcined gypsum (at least a portion of which is in the form of crystals in and about the voids in the host particles), and tetrametaphosphate ion. The method comprises forming such a mixture, depositing it on a surface or into a mold, and allowing it to set and dry. In other respects, the composition and method can be practiced with the same components and in the same manner as the corresponding compositions and methods for preparing composite board of the prior art, for example, as described in U.S. Pat. No. 5,320,677, the disclosure of which is incorporated herein by reference.

In some preferred embodiments wherein the method and composition are for preparing a machinable material, tetrametaphosphate compound is employed in the concentrations and manner described above. In some preferred forms of such embodiments the composition comprises a mixture of calcined gypsum, a water-soluble tetrametaphosphate salt, a starch, and particles of a water-redispersible polymer. The composition can be mixed with water to produce an inventive mixture of water, calcined gypsum, tetrametaphosphate ion, starch, and particles of water-redispersible polymer. The method comprises forming such a mixture, depositing it on a surface or into a mold, and allowing it to set and dry.

In respect to aspects other than the inclusion of tetrametaphosphate salts and ions, the composition and method can be practiced with the same components and in the same manner as the corresponding compositions and methods for preparing machinable plaster material of the prior art, for example, as described in U.S. Pat. No. 5,534,059, the disclosure of which is incorporated herein by reference.

In some preferred inventive embodiments wherein the method and composition are for producing a material employed to finish a joint between edges of gypsum boards, tetrametaphosphate salt or ion is employed in the concentrations described above. In respect to aspects other than the inclusion of tetrametaphosphate salts and ions, the composition and method can be practiced with the same components and in the same manner as the corresponding compositions and methods for producing a joint finishing material in the prior art, for example, as described in U.S. Pat. No. 3,297,601, the disclosure of which is incorporated herein by reference. In some preferred forms of such embodiments, the composition comprises a mixture of calcined gypsum, a water-soluble tetrametaphosphate salt, a binder, a thickener, and a non-leveling agent. The composition can be mixed with water to produce an inventive mixture of calcined gypsum, tetrametaphosphate ion, binder, thickener, and a non-leveling agent. The method comprising forming such a mixture, inserting it into a joint between edges of gypsum boards, and allowing it to set and dry.

In such preferred joint finishing embodiments the binder, thickener, and non-leveling agent are chosen form the components well known to those skilled in the joint compound art. For example, the binder can be a conventional latex binder, with poly(vinyl acetate) and poly(ethylene-co-vinyl acetate) being preferred and being included in a range from about 1 to about 15 percent by weight of the composition. An example of a useful thickener is a cellulosic thickener, e.g., ethylhydroxy, ethylcellulose, hydroxypropyl methylcellulose, methylhydroxypropyl cellulose, or hydroxyethyl cellulose, included in a range of from about 0.1 to about 2 percent by weight of the composition. Examples of suitable non-leveling agents are attapulgite, sepiolite, bentonite, and montmorillonite clays, included in a range of from about 1 to about 10 percent by weight of the composition.

In some preferred inventive embodiments wherein the method and composition are for preparing an acoustical tile, tetrametaphosphate compound is included in the concentrations described above. In some preferred forms of such embodiments the composition comprises a mixture of water, calcined gypsum, tetrametaphosphate ion, a gelatinized starch, and mineral wool or a mixture of water, calcined gypsum, tetrametaphosphate ion, a gelatinized starch, expanded perlite particles, and a fiber reinforcing agent. The method comprises forming such a mixture, casting it into a tray, and allowing it to set and dry. In respect to aspects other than the inclusion of tetrametaphosphate compound, the composition and method can be practiced with the same components and in the same manner as the corresponding compositions and methods for producing an acoustical tile of the prior art, for example, as described in U.S. Pat. Nos. 5,395,438 and 3,246,063, the disclosures of which are incorporated herein by reference.

The following examples are presented to further illustrate some preferred embodiments of the invention but should not be construed as any limitation on the scope of the invention. Unless otherwise indicated, concentrations of materials in compositions and mixtures are given in percent by weight based upon the weight of calcined gypsum present. The abbreviation "STMP" stands for sodium trimetaphosphate, and the abbreviation "SC" stands for sodium cyclotetraphosphate (i.e., sodium tetrametaphosphate).

EXAMPLE 1

Resistance to Permanent Deformation (Laboratory Gypsum Board Sag Resistance)

Samples of set gypsum-containing boards were prepared in a laboratory in accordance with the invention and compared, in regard to resistance to permanent deformation, with sample boards prepared using methods and compositions that do not include sodium tetrametaphosphate.

Samples were prepared by mixing in a 4 liter WARING blender for 10 seconds at low speed: 0.7 kg of beta calcium sulfate hemihydrate (United States Gypsum Company's Southard plant); 1.0 g of a set accelerator powder comprising fine ground particles of calcium sulfate dihydrate coated with sugar to maintain efficiency and heated as described in U.S. Pat. No. 3,573,947 (the disclosure of which is hereby incorporated by reference), herein referred to as a "climate stabilized accelerator" (CSA); 1 liter of tap water; and 0 g additive (control samples), 0.7 g (0.1%) of sodium trimetaphosphate, or 0.7 g (0.1%) of sodium tetrametaphosphate. The slurries thus formed were cast into trays to prepare flat gypsum board samples, each having dimensions of about 6×24×½ inch. After the calcium sulfate hemihydrate set to form an interlocking matrix of set gypsum (calcium sulfate dihydrate), the boards were dried in a 112° F. oven to constant weight. The final measured weight of each board was recorded. No paper facing was applied to these boards, in order to avoid the effect of paper covers on the sag performance of the gypsum board.

Each dried board was then laid in a horizontal position upon two ½-inch-wide supports whose length extended the full width of the board, with one support at each end of the board. The boards remained in this position for a specified period of time (in this example, 2 weeks) under continuous surrounding conditions of 90° F. temperature and 90 percent relative humidity. The deflection (i.e., extent of sag) of the board was then determined by measuring the distance (in inches) of the center of the top surface of the board from the imaginary horizontal plane extending between the top edges of the ends of the board. The resistance to permanent deformation of the set gypsum matrix of the board is considered to be inversely proportional to the extent of the sag of the board. Thus, the greater the extent of the sag is, the lower is the relative resistance to permanent deformation of the set gypsum matrix comprising the board. The test of resistance to permanent deformation, measured as "deflection," is reported in Table 1.

TABLE 1

| Additive | Deflection |
|---|---|
| Control | 3.25" |
| STMP | 0.02" |
| Tetrametaphosphate precipitated using NaCl | 0.01" |
| Tetrametaphosphate precipitated using ethanol | 0.03" |

As seen in Table 1, the two samples that included a tetrametaphosphate in the calcined gypsum slurry in a pre-set treatment exhibited significantly less deflection (i.e., sag) as compared with the control and comparable with that of the sample in which STMP was employed.

EXAMPLE 2

Rate of Hydration

This Example illustrates the rate of hydration of calcined gypsum to calcium sulfate dihydrate with the presence of sodium cyclotetraphosphate in a pre-set treatment, in accordance with the present invention, as compared with the rate of hydration where no phosphate additive (control) is present, and where sodium trimetaphosphate is present.

Four batches were prepared. For each batch, 1200 grams of calcium sulfate hemihydrate (United States Gypsum Company's Southard plant) was measured and set aside. Three grams of CSA was blended with the calcium sulfate hemihydrate powder until all were thoroughly dispersed. A 1320 ml quantity of water at 75° F. was measured and poured into a 4 liter Waring blender with high shear blades.

In one of the batches, 1.2 g (0.1%) of sodium cyclotetraphosphate, precipitated with ethanol, was added. In the second batch, 1.2 g (0.1%) of sodium cyclotetraphosphate, precipitated with NaCl, was added. In the third batch, 1.2 g (0.1%) of sodium trimetaphosphate (STMP) was added. In the fourth batch, no phosphate was added.

In each batch, the powdered mixture was allowed to soak for 10 seconds, and then blended on medium speed for 30 seconds to form a slurry. In each batch, the slurry was poured into molds to permit casting of 9 cubes (2 inches per side).

The remaining slurry was poured into an insulated test cell. The temperature was measured every 5 seconds with a temperature probe and recorded. Since the setting reaction is exothermic, the extent of the reaction was measured by the temperature rise. The Time to 50% hydration was determined to be the time in minutes to reach the temperature half way between the minimum and maximum temperatures recorded during the test. The results are provided in Table 2, which indicates hydration times for each batch.

TABLE 2

| Additive | Total Time to 50% Hydration | Total Time to 98% Hydration |
|---|---|---|
| SC/Ethanol | 6.8 | 10.0 |
| SC/NaCl | 6.6 | 9.6 |
| STMP | 6.2 | 9.3 |
| Control | 6.6 | 9.5 |

As seen in Table 2, each of the additives had little effect on rate of hydration. Thus, advantageously, the addition of the tetrametaphosphate in a pre-set treatment enhances sag resistance and compressive strength, without significantly adversely affecting hydration time.

EXAMPLE 3

Laboratory Cube Compressive Strength

This Example compares the compressive strength of cubes prepared with the inclusion of a tetrametaphosphate compound in a pre-set treatment with that of cubes prepared with no phosphate additive and with cubes prepared with the inclusion of sodium trimetaphosphate in a pre-set treatment. The test procedure employed was in accordance with ASTM C472-93.

After the calcium sulfate hemihydrate for the 9 cubes from each batch described in Example 2 set to form calcium sulfate dihydrate, the cubes were removed from the molds and dried in a ventilated oven at 112° F. for at least 72 hours to achieve a constant weight. The dried cubes had a density of about 50 pounds per cubic foot (pcf).

The compressive strength of each dry cube was measured on a SATEC testing machine. Results are reported in Table 3, below, as average values of nine samples tested for each batch. Strength values for control samples varied, because various sources of beta calcium sulfate hemihydrate and/or different batches of beta calcium sulfate hemihydrate were employed. Results in the table are reported in the form of the measured compressive strength in pounds per square-inch (psi) and percent change in strength as compared with a theoretical expected value (identified as "normal" in Table 3) for the density of the cube.

TABLE 3

| Cube Series | Wet Weight (g) | Dry Weight (g) | % H$_2$O LOST | P.S.I | P.S.I. NORMAL | % NORMAL |
|---|---|---|---|---|---|---|
| SC/Ethanol | 187.7 | 105.1 | 44.0% | 1286.3 | 903.2 | 142% |
| SC/NaCl | 188.1 | 105.3 | 44.0% | 1310.4 | 911.7 | 144% |
| STMP | 187.6 | 105.1 | 44.0% | 1410.1 | 903.9 | 156% |
| None | 187.2 | 104.8 | 44.0% | 1236.0 | 893.3 | 138% |

As seen in Table 3, the compressive strength of the cubes prepared with sodium tetrametaphosphate or sodium trimetaphosphate in the pre-set treatment increased as compared with the control. Thus, Table 3 illustrates that the cube has greater strength than it would have if the sodium tetrametaphosphate compound had not been included in a pre-set treatment in accordance with the invention. If the concentration of the sodium tetrametaphosphate added to the mixture had been significantly lower (e.g., as low as 0.004%), although no measurable strength increase might be seen, there still would be no strength decrease.

All of the references cited herein, including patents, patent applications, and publications, are hereby incorporated in their entireties by reference.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the scope of the invention as defined by the following claims.

What is claimed is:

1. A composition comprising a mixture of a calcium sulfate material, water, and a tetrametaphosphate compound, wherein when said composition is cast in the form of a cube comprising an interlocking matrix of set gypsum according to ASTM C472-93, said cube has a compressive strength as measured by ASTM C472-93 greater than or equal to the compressive strength that would result if the tetrametaphosphate was not included in the mixture.

2. The composition of claim 1, wherein the mixture further comprises a pregelatinized starch.

3. The composition of claim 1, wherein the mixture further comprises aqueous foam.

4. The composition of claim 3, wherein the mixture further comprises a pregelatinized starch.

5. The composition of claim 1, further comprising starch, and particles of a water-redispersible polymer.

6. A machinable set gypsum-containing product formed from the composition of claim 5.

7. The composition of claim 1, further comprising binder, a thickener, and a non-leveling agent.

8. A product for finishing joints between edges of gypsum boards formed from the composition of claim 7.

9. The composition of claim 1, further comprising gelatinized starch, and a mineral wool.

10. An acoustical tile formed from the composition of claim 9.

11. The composition of claim 1, further comprising gelatinized starch, expanded perlite particles, and a fiber reinforcing agent.

12. An acoustical tile formed from the composition of claim 11.

13. The composition of claim 1, further comprising an accelerator.

14. The composition of claim 13, wherein the mixture further comprises a pregelatinized starch.

15. The composition of claim 13, wherein the mixture further comprises an aqueous foam.

16. The composition of claim 15, wherein the mixture further comprises a pregelatinized starch.

17. The composition of claim 1, wherein when said composition is cast in the form ½ inch board, the board has a sag resistance, as determined according to ASTM C473-95, of less than about 0.1 inch per two foot length of said board.

18. A gypsum board formed from the composition of claim 13.

19. A composition comprising a mixture of host particles having accessible voids therein; calcium sulfate material, at least a portion of which is in the form of crystals in and about the voids of the host particles; and a tetrametaphosphate compound, wherein when said composition is cast in the form of a cube comprising an interlocking matrix of set gypsum according to ASTM C472-93, said cube has a compressive strength as measured by ASTM C472-93 greater than or equal to the compressive strength that would result if the tetrametaphosphate was not included in the mixture.

20. The composition of claim 19, wherein when said composition is cast in the form a ½ inch board, the board has a sag resistance, as determined according to ASTM C473-95, of less than about 0.1 inch per two foot length of said board.

21. A composition comprising a mixture of a calcium sulfate material, water, and a tetrametaphosphate compound, wherein when said composition is used to prepare a product comprising an interlocking matrix of set gypsum, said product has greater strength than it would have if the tetrametaphosphate compound had not been included in the mixture.

22. The composition of claim 21, wherein the mixture further comprises a pregelatinized starch.

23. The composition of claim 21, wherein the mixture further comprises a pregelatinized starch.

24. The composition of claim 21, wherein the mixture further comprises aqueous foam.

25. Gypsum board comprising an interlocking matrix of set gypsum formed from a mixture comprising calcium sulfate material, water and at least one tetrametaphosphate compound, wherein, when said mixture is cast in the form of a cube comprising an interlocking matrix of set gypsum according to ASTM C472-93, said cube has a compressive strength as measured by ASTM C472-93 greater than or equal to the compressive strength that would result if the tetrametaphosphate was not included in the mixture.

26. The gypsum board of claim 25, wherein the amount of said tetrametaphosphate compound is from about 0.004 to about 2.0% by weight of said calcined gypsum.

27. The gypsum board of claim 25, wherein said set gypsum is in the form of a core material sandwiched between cover sheets.

28. The gypsum board of claim 27, wherein said cover sheets comprise paper.

29. The gypsum board of claim 25, wherein said tetrametaphosphate compound is selected from the group consisting of sodium tetrametaphosphate, lithium tetrametaphosphate, potassium tetrametaphosphate, ammonium tetrametaphosphate, aluminum tetrametaphosphate, and mixtures thereof.

30. The gypsum board of claim 25, wherein said tetrametaphosphate is sodium tetrametaphosphate.

31. The gypsum board of claim 25, wherein said gypsum board has a drying shrinkage of less than about 0.06 inch per four foot width and less than about 0.30 inch per twelve foot length, as determined according to ASTM C473-95.

32. The gypsum board of claim 25, said gypsum board having a drying shrinkage of less than about 0.13% across its width and less than about 0.26% across its length, as determined according to ASTM C473-95.

33. The gypsum board of claim 25, wherein said gypsum board further comprises a pregelatinized starch.

34. The gypsum board of claim 33, wherein the amount of pregelatinized starch is from about 0.08 to about 0.5 percent by weight of the gypsum.

35. The gypsum board of claim 32, wherein the amount of pregelatinized starch is from about 0.16 to about 0.4 percent by weight of the gypsum.

36. The gypsum board of claim 33, wherein the amount of pregelatinized starch is about 0.3 percent by weight of the gypsum.

37. The gypsum board of claim 25, wherein said set gypsum has voids uniformly distributed therein.

38. The gypsum board of claim 37, wherein said set gypsum is further formed from at least one foaming agent, having the formula:

$$CH_3(CH_2)_xCH_2(OCH_2CH_2)_yOSO_3 \ominus M \oplus$$

wherein X is a number from 2 to 20, Y is a number from 0 to 10 and is 0 in at least 50 weight percent of the foaming agent or blend of foaming agents, and M is a cation.

39. The gypsum board of claim 38, wherein Y is 0 in from 86 to 99 weight percent of the foaming agent.

40. The gypsum board of claim 37, wherein the set gypsum is further formed from a pregelatinized starch.

41. The gypsum board of claim 25, wherein the gypsum board has a sag resistance, as determined according to ASTM C473-95, of less than about 0.1 inch per two foot length of said board.

42. The gypsum board of claim 1, wherein the tetrametaphosphate compound has been included in the mixture in an amount such that the gypsum board has a sag resistance, as determined according to ASTM C473-95, of less than about 0.1 inch per two-foot length of said board.

43. A composition comprising a mixture of a calcium sulfate material, water, and a tetrametaphosphate compound, wherein when said composition is cast in the form a ½ inch board comprising an interlocking matrix of set gypsum, said board has a sag resistance, as determined according to ASTM C473-95, of less than about 0.1 inch per two foot length of said board.

44. A gypsum board comprising a core of material sandwiched between cover sheets, wherein the core comprises an interlocking matrix of set gypsum, said board having been prepared by a method comprising:

forming or depositing a mixture between the cover sheets, wherein the mixture comprises a calcium sulfate material, water, and one or more tetrametaphosphate compounds, and maintaining the mixture under conditions sufficient for the calcium sulfate material to form the interlocking matrix of set gypsum, the tetrametaphosphate compound having been included in the mixture in an amount such that, when the mixture is cast in the form of a cube comprising an interlocking matrix of set gypsum according to ASTM C472-93, the cube has a compressive strength as measured by ASTM C472-93 greater than or equal to the compressive strength that would result if the tetrametaphosphate was not included in the mixture.

\* \* \* \* \*